(12) United States Patent
Kim et al.

(10) Patent No.: US 8,656,084 B2
(45) Date of Patent: Feb. 18, 2014

(54) USER DEVICE INCLUDING FLASH MEMORY STORING INDEX AND INDEX ACCESSING METHOD THEREOF

(75) Inventors: Jeong-Eun Kim, Seoul (KR); Namyoon Woo, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 533 days.

(21) Appl. No.: 12/656,607

(22) Filed: Feb. 4, 2010

(65) Prior Publication Data

US 2010/0223421 A1  Sep. 2, 2010

(30) Foreign Application Priority Data

Feb. 27, 2009 (KR) .................. 10-2009-0016866

(51) Int. Cl.
*G06F 12/10* (2006.01)

(52) U.S. Cl.
USPC .... 711/103; 711/206; 711/216; 711/E12.008; 711/E12.059; 711/E12.06

(58) Field of Classification Search
None
See application file for complete search history.

(56) References Cited

U.S. PATENT DOCUMENTS

| | | | |
|---|---|---|---|
| 7,480,766 B2* | 1/2009 | Gorobets | 711/115 |
| 2005/0141312 A1 | 6/2005 | Sinclair | |
| 2006/0282644 A1* | 12/2006 | Wong | 711/206 |

FOREIGN PATENT DOCUMENTS

| | | |
|---|---|---|
| JP | 2004-234188 | 8/2004 |
| JP | 2007-520804 | 7/2007 |
| KR | 10-2007-0007264 | 1/2007 |
| KR | 10-2008-0058834 | 6/2008 |
| WO | WO 2005/066793 | 7/2005 |

* cited by examiner

*Primary Examiner* — Reginald Bragdon
*Assistant Examiner* — Eric Loonan
(74) *Attorney, Agent, or Firm* — Harness, Dickey & Pierce, P.L.C.

(57) ABSTRACT

A user device includes a flash memory configured to store an index including a plurality of index nodes and a controller configured to control the flash memory. The controller is configured to detect a pointer ID corresponding to a selected key of a first index node, translate the detected pointer ID to an index address by using a pointer table, and access a second index node corresponding to the selected key by using the index address.

16 Claims, 12 Drawing Sheets

Fig. 3

| Node | Data | |
| --- | --- | --- |
| | Key | Pointer |
| 111 | A | ADDR_112 |
| | B | ADDR_113 |
| 112 | a | ADDR_114 |
| | b | ADDR_115 |
| 113 | c | ADDR_116 |
| | d | ADDR_117 |
| 114 | 1 | |
| | 2 | |
| 115 | 3 | |
| | 4 | |
| 116 | 5 | |
| | 6 | |
| 117 | 7 | |
| | 8 | |

Fig. 5

| Node | Data | |
| --- | --- | --- |
| | Key | Pointer |
| 111' | A | ADDR_112 |
| | B | ADDR_113' |
| 112 | a | ADDR_114 |
| | b | ADDR_115 |
| 113' | c | ADDR_116' |
| | d | ADDR_117 |
| 114 | 1 | |
| | 2 | |
| 115 | 3 | |
| | 4 | |
| 116' | 5' | |
| | 6' | |
| 117 | 7 | |
| | 8 | |

Fig. 7

| Node | Data | |
|---|---|---|
| | Key | Pointer |
| 111 | A | ID_112 |
| | B | ID_113 |
| 112 | a | ID_114 |
| | b | ID_115 |
| 113 | c | ID_116 |
| | d | ID_117 |
| 114 | 1 | |
| | 2 | |
| 115 | 3 | |
| | 4 | |
| 116 | 5 | |
| | 6 | |
| 117 | 7 | |
| | 8 | |

| Pointer ID | Index ADDR |
|---|---|
| ID_112 | ADDR_112 |
| ID_113 | ADDR_113 |
| ID_114 | ADDR_114 |
| ID_115 | ADDR_115 |
| ID_116 | ADDR_116 |
| ID_117 | ADDR_117 |

USER DEVICE INCLUDING FLASH MEMORY STORING INDEX AND INDEX ACCESSING METHOD THEREOF

CROSS-REFERENCE TO RELATED APPLICATIONS

This U.S. non-provisional patent application claims priority under 35 U.S.C. §119 to Korean Patent Application No. 10-2009-0016866, filed on Feb. 27, 2009, the entirety of which is hereby incorporated by reference.

BACKGROUND

1. Field

Example embodiments relate to semiconductor memory devices and, particularly, to a user device including a flash memory device storing an index and an access method thereof.

2. Description

A semiconductor memory device is a memory device capable of storing data and retrieving target data by reading stored data, as needed. Semiconductor memory devices may be classified into volatile memory devices and nonvolatile memory devices.

Volatile semiconductor devices lose their data when their power supplies are interrupted, while nonvolatile memory devices retain their stored data even when their power supplies are interrupted. Volatile memory devices include static random access memories (SRAM), dynamic random access memories (DRAM), and synchronous dynamic random access memories (SDRAM). Nonvolatile memory devices include read only memories (ROM), programmable ROM (PROM), erasable PROM (EPROM), electrically EPROM (EEPROM), flash memories, phase-changeable random access memories (PRAM), magnetic random access memories (MRAM), and ferroelectric random access memories (FRAM). Flash memories are classified into two types, i.e., NOR-type flash memories and NAND-type flash memories.

SUMMARY

According to an example embodiment, a user device may include a flash memory configured to store an index including a plurality of index nodes and a controller configured to control the flash memory. The controller may be configured to detect a pointer ID corresponding to a selected key of a first index node of the plurality of index nodes, translate the detected pointer ID to an index address by using a pointer table, and access a second index node of the plurality of index nodes corresponding to the selected key based on the index address.

According to an example embodiment, the controller may include an index control unit configured to control an operation of accessing the index stored in the flash memory.

According to an example embodiment, the index control unit may include the pointer table configured to indicate a mapping relationship between the pointer ID and an index address; and a pointer translator configured to translate the detected pointer ID to an index address by using the pointer table.

According to an example embodiment, when the second index node of the plurality of index nodes is updated, the controller may be configured to update an index address mapped to the pointer ID of the first index node to an address of an area of the flash memory in which the updated second index node is stored.

According to an example embodiment, the pointer table may be stored in the flash memory.

According to an example embodiment, the user device may further include an operation memory, wherein the controller is configured to look up the pointer table after loading the pointer table to the operation memory.

According to an example embodiment, when the pointer table is updated, the controller may be configured to update the flash memory with the updated pointer table.

According to an example embodiment, the controller may be configured to update the flash memory with the pointer table loaded in the operation memory at regular time intervals.

According to an example embodiment, the user device may further include a resistance variable memory, wherein the pointer table may be stored and driven in the resistance variable memory.

According to an example embodiment, the flash memory and the controller may constitute a solid-state drive (SSD).

According to another example embodiment, the flash memory and the controller may constitute a memory card.

According to an example embodiment, a method of accessing an index stored in a flash memory may include detecting a pointer ID corresponding to a selected key of a first index node; translating the detected pointer ID to an index address by using a pointer table; and accessing a second index node corresponding to the selected key by using the index address.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 3 illustrates data of index nodes of the index shown in FIG. 2.

FIG. 5 illustrates data of the index nodes of the index shown in FIG. 4.

FIG. 7 illustrates data of index nodes according to an example embodiment.

FIG. 8 illustrates an example of an address table shown in FIG. 6.

DETAILED DESCRIPTION OF EXAMPLE EMBODIMENTS

Figure 1:
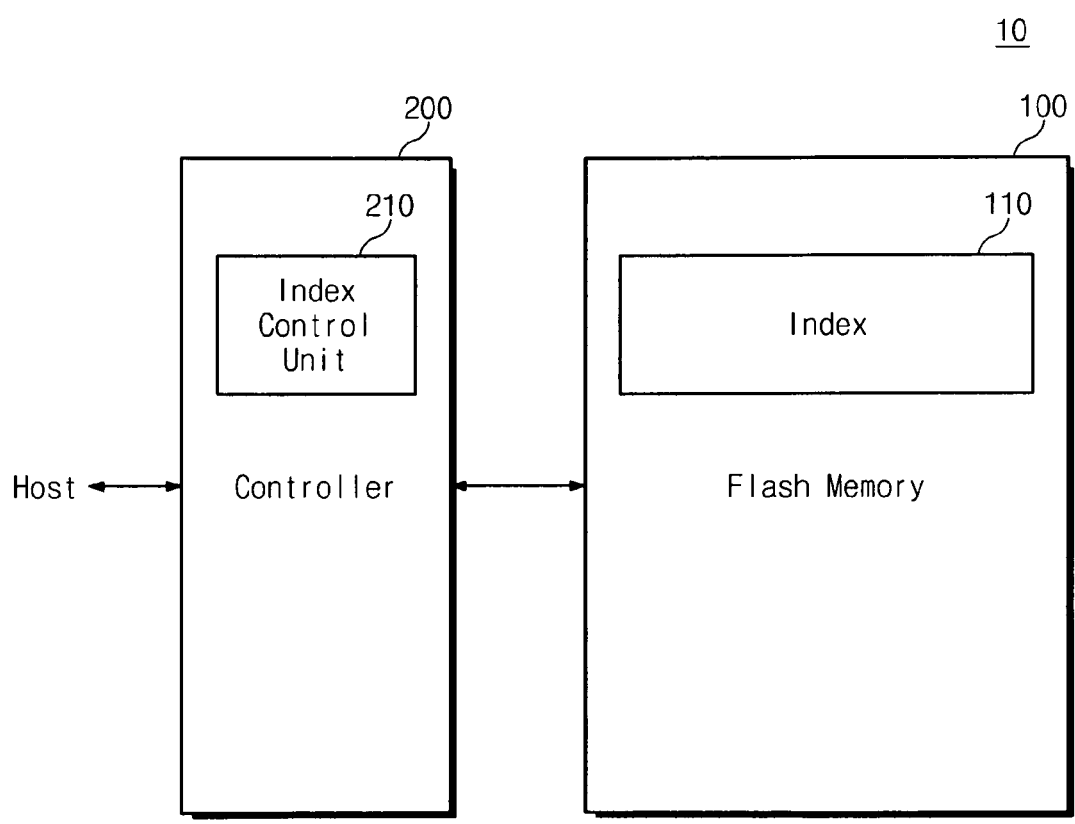
FIG. 1 is a block diagram of a user device according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers; steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of a user device 10 according to an example embodiment. The user device 10 includes a flash memory 100 and a controller 200.

The flash memory 100 may include a memory cell array for storing data, a read/write circuit for writing/reading data to/from the memory cell array, an address decoder for decoding an externally transmitted address before transmitting the decoded address to the read/write circuit, and a control logic for controlling all operations of the flash memory 100.

The flash memory 100 stores an index 110. According to example embodiments, the index 110 stored in the flash memory 100 may be an index tree where a plurality of index nodes are arranged in a tree hierarchy.

The controller 200 is connected to a host and the flash memory 100. The controller 200 transmits data read out of the flash memory 100 to the host and stores data transmitted from the host in the flash memory 100.

The controller 200 may include conventional elements such as a random access memory (RAM), a processing unit, a host interface, and a memory interface. The RAM may be used as an operation memory of the processing unit. The processing unit may control the operations of the controller 200.

The host interface may include a protocol for data exchange between the host and the controller 200. According to example embodiments, the controller 200 may be configured to communicate with an external entity (host) through one of various interface protocols such as USB, MMC, PCI-E, Advance Technology Attachment (ATA), Serial-ATA, Parallel-ATA, SCSI, ESDI, and Integrated Drive Electronics (IDE).

The memory interface may interface with the flash memory 100. The controller 200 may further include an error correction code block (ECC), which may detect and correct an error of data read out of the flash memory 100.

As shown in FIG. 1, the controller 200 includes an index control unit 210. The index control unit 210 controls an operation of accessing the index 110 stored in the flash memory 100. According to example embodiments, the index control unit 210 may be embodied with hardware such as a digital circuit, an analog circuit or a combination of digital and analog circuits. Alternatively, the index control unit 210 may be embodied with a combination of hardware and software. According to other example embodiments, the index control unit 210 may be embodied as a part of a flash translation layer (FTL) for controlling the flash memory 100.

The flash memory 100 and the controller 200 may be integrated into one semiconductor device. According to example embodiments, flash memory 100 and the controller 200 may be integrated into one semiconductor device to constitute a memory card. For instance, the controller 100 and the semiconductor memory device 200 may be integrated into one semiconductor device to constitute a PC card (PCMCIA), a compact flash card (CF), a smart media card (SM/SMC), a memory stick, a multimedia card (MMC, RS-MMC, MMC-micro), an SD card (SD, miniSD, microSD), and a universal flash memory device (UFS).

According to another example embodiment, the flash memory 100 and the controller 200 may be integrated into one semiconductor device to constitute a solid-state drive (SSD). When the user device 10 is used as an SSD, an operation speed of a host connected to the user device 10 may be improved.

According to example embodiments, the user device 10 may be used in a computer, a portable computer, a UMPC, a workstation, a net-book, a PDA, a wet tablet, a wireless phone, a mobile phone, a smart phone, a digital camera, a digital audio recorder/player, a digital picture/video recorder/player, an apparatus for transmitting and receiving information in a wireless environment, one of various electronic devices constituting a home network, one of various electronic devices constituting a computer network, one of various electronic devices constituting a telematics network or one of various electronic devices, such as a solid-state disk/drive (SSD) or a memory card, constituting a computing system or the like.

According to example embodiments, the flash memory 100 or the user device 10 may be mounted using various forms of packages. The semiconductor memory device 200 or the user device 10 may be mounted using packages, for example, PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP).

Figure 2:
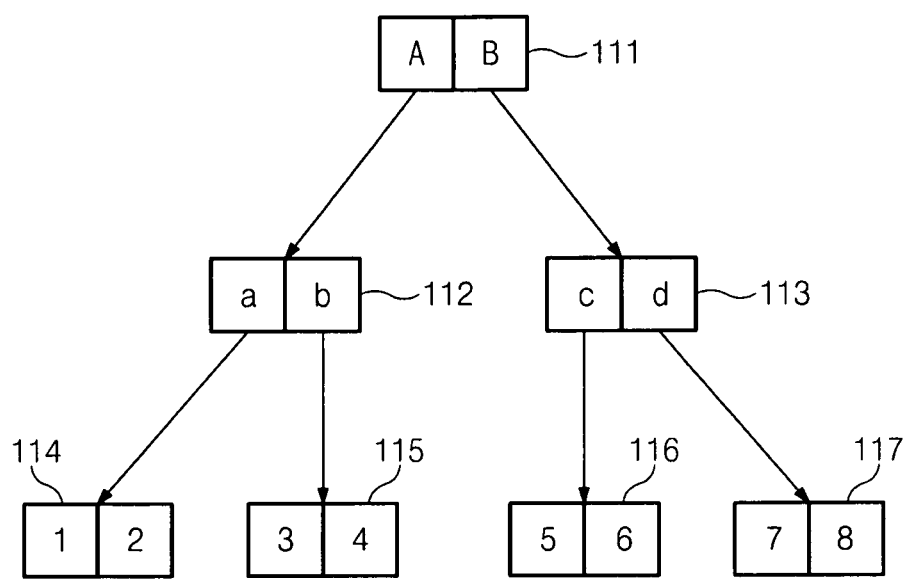
FIG. 2 illustrates an example embodiment of an index stored in a flash memory device of FIG. 1.

FIG. 2 illustrates an example of an index 110 stored in the flash memory 100 shown in FIG. 1. In FIG. 2, the index 110 is an index tree where a plurality of index nodes 111-117 are arranged in a tree hierarchy. However, the structure of the index 110 is not limited thereto.

The index node 111 includes two keys "A" and "B". The key "A" of the index node 111 corresponds to an index node 112. That is, when the key "A" of the index node 111 is selected, the index node 112 may be accessed. The key "B" of the index node 111 corresponds to an index node 113. That is, when the key "B" of the index node 111 is selected, the index node 113 may be accessed.

The index node 112 includes two keys "a" and "b". The key "a" of the index node 112 corresponds to an index node 114, and the key "b" thereof corresponds to an index node 115. The index node 113 includes two keys "c" and "d". The key "c" of the index node 113 corresponds to an index node 116, and the key "d" thereof corresponds to an index node 117.

The index node 114 includes two keys "1" and "2". The index node 115 includes two keys "3" and "4". The index node 116 includes two keys "5" and "6". The index node 117 includes two keys "7" and "8". In FIG. 2, the index tree 110 is comprised of three layers. However, the number of layers of the index tree 110 is not limited thereto.

Data on each index node may include pointers indicating an area of the flash memory in which keys (e.g., "A" and "B") of a pertinent index node (e.g., 111) and index nodes (e.g., 112 and 113) corresponding to keys of the pertinent index node (e.g., 111) are stored.

FIG. 3 illustrates an example of data of the index nodes 111-117 of the index 110 shown in FIG. 2. Referring to FIG. 3, data corresponding to each index node include keys and pointers.

Data corresponding to the index node 111 includes keys "A" and "B" and pointers corresponding to the keys "A" and "B". The pointer corresponding to the key "A" may indicate an area in which the index node 112 is stored. For example, a pointer corresponding to the key "A" may indicates the address ADDR_112 of an area of the flash memory 100 in which the index node 112 is stored. A pointer corresponding to the key "B" may indicate an area in which the index node 113 is stored. For example, a pointer corresponding to the key "B" may indicate an address ADDR_113 of an area of the flash memory 100 in which the index node 113 is stored.

That is, when the key "A" of the index node 111 is selected, the pointer corresponding to the key "A" may be accessed. The pointer corresponding to the key "A" indicates an address ADDR_112 of the index node 113. The index node 112 may be accessed based on the accessed address ADDR_113. Similarly, when the key "B" of the index node 111 is selected, an address ADDR_113 of the index node 113 may be accessed from the pointer corresponding to the key "B". The index node 113 may be accessed based on the accessed address ADDR_113.

Data corresponding to the index node 112 includes keys "a" and "b" and pointers corresponding to the keys "a" and "b". The pointer corresponding to the key "a" may indicate an address ADDR_114 of an area in which data of the index node 114 is stored. The pointer corresponding to the key "b" may indicate an address ADDR_115 of an area in which data of the index node 115 is stored.

Data corresponding to the index node 113 includes keys "c" and "d" and pointers corresponding to the keys "c" and "d". The pointer corresponding to the key "c" may indicate an address ADD_116 of an area in which data of the index node 116 is stored. The pointer corresponding to the key "d" may indicate address ADDR_117 of an area in which data of the index node 117 is stored.

That is, when the key "a" of the index node 112 is selected, the pointer corresponding to the key "a" may be accessed. The pointer corresponding to the key "a" may indicate an address ADDR_114 of the index node 114 corresponding to the key "a". The index node 114 may be accessed based on the accessed address ADDR_114. Similarly, when one of the keys "b"~"d" is selected, a pointer corresponding to the selected key may be accessed. A pointer of each key indicates an address of a corresponding one of the index nodes ADDR_115~ADDR_117. An index node corresponding to the selected key may be accessed based on the accessed address.

Data corresponding to the index node 114 includes keys "1" and "2". Because there is no index node corresponding to the keys "1" and "2" of the index node 114, pointers corresponding to the keys "1" and "2" of the index node 114 may be set to have a blank or null value. Similarly, pointers corresponding to keys "3"~"8" may also be set to have a blank or null value.

It will be understood that when an index node corresponding to the keys "1"~"8" of the index nodes 114-117 exists or is generated, a pointer corresponding to a pertinent key of the index node exists or is generated.

Figure 4:
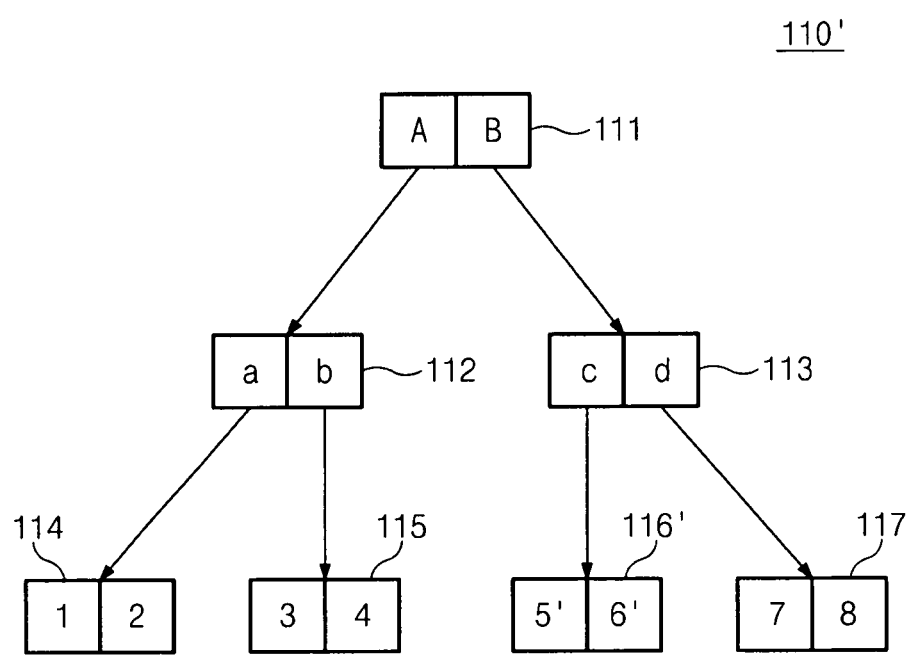
FIG. 4 illustrates an example case wherein one of the index nodes of the index shown in FIG. 2 is updated.

FIG. 4 illustrates the case where one of the index nodes 111-117 of the index 110 shown in FIG. 2 is updated. In FIG. 4, the index node 116 shown in FIG. 2 is updated to an index node 116'. According to example embodiments, an update may include change in a key value or range of the index node 116.

The index 110 is stored in a flash memory (100 in FIG. 1). The flash memory 100 has an erase-before-write characteristic. For example, it is assumed that first data is written into a specific storage area of the flash memory 100. In order to write another data into an area in which the first data is stored, it is necessary to erase the stored data in the area. That is, when the first data is updated to second data, the first data is erased and the second data is written into the area.

In the flash memory 100, a write operation is conducted by a unit of page and an erase operation is conducted by a unit of block. According to example. embodiments, one block of the flash memory 100 includes 32 pages, 64 pages or more. That is, when first data written to a specific page of the flash memory 100 is updated to second data, a block including the page into which the first data is written is erased and the second data is then written.

As set forth above, a random write operation such as update of data stored in the flash memory 100 causes an overhead such as erasure of a pertinent block. As an approach to prevent the disadvantage, a mapping table is used to invalidate a storage area to be erased and write data to be updated into a free storage area. Unfortunately, even in the case where a mapping table is used, an overhead such as garbage collection or merge may occur.

FIG. 5 illustrates data of the index nodes of the index 110' shown in FIG. 4. As set forth in FIG. 4, it is assumed that an index node 116 is updated to an index node 116'. The index node 116 may be invalidated, and the updated index node 116' may be written into a free storage area. That is, an address of the index node 116' may be different from that of the index node 116. For example, it is assumed that the address of the index node 116' is ADDR_116'.

A pointer corresponding to a key "c" of the index node 113 indicates an address of the index node 116. Since the address ADDR_116' of the updated index node 116' is different from the address ADDR_116 of the original index node 116, the pointer corresponding to the key "c" of the index node 113 is updated. The pointer corresponding to the key "c" of the index node 113 may be updated to indicate the address ADDR_116'. Since the address indicated by the pointer corresponding to the key "c" is updated, the index node 113 may be updated to the index node 113'.

That is, data of the index node 113 may be invalidated and data of the updated index node 113' may be written into a free storage area. The pointer corresponding to the key "c" of the updated index node 113' may indicate the address ADDR_116' of the index node 116'. The address ADDR_113 of the updated index node 113' may be different from the address ADDR_113 of the original index node 113. For example, it is assumed that the address of the index node 113' is ADDR_113'.

A pointer corresponding to a key "B" of the index node 111 indicates an address of the index node 113. Since the address ADDR_113' of the updated index node 113' is different from the address ADDR_113 of the original index node 113, the pointer corresponding to the pointer "B" of the index node 111 is also updated. The pointer corresponding to the pointer "B" of the index node 111 may be updated to indicate the address ADDR_113' from the address ADDR_113. Since the pointer corresponding to the key "B" is updated, the index node 111' may be updated. That is, data of the index node 111 is invalidated and data of the updated index node 111' may be written into a free storage area.

As set forth above, if an index node of a lower layer of the index tree 110 is updated, an index node of a corresponding upper layer may also be updated. According to example embodiments, the update of the index node 116 leads to update of index nodes 116, 113, and 111. In a flash memory having an erase-before-write characteristic, update of stored data causes an overhead. According to some example embodiments, if data of each index node is updated to be stored in one page, update of the one page, i.e., the index node 116 may lead to update of three pages, i.e., the index nodes 116, 113, and 111.

According to other example embodiments, areas in which index nodes 111-117 are stored may be altered by an operation such as garbage collection or merge. Particularly, if an area of the flash memory in which the index node 116 is stored is altered by an operation such as garbage collection or merge, there may also be a required to update of the index nodes 113 and 111, as set forth above.

Figure 6:
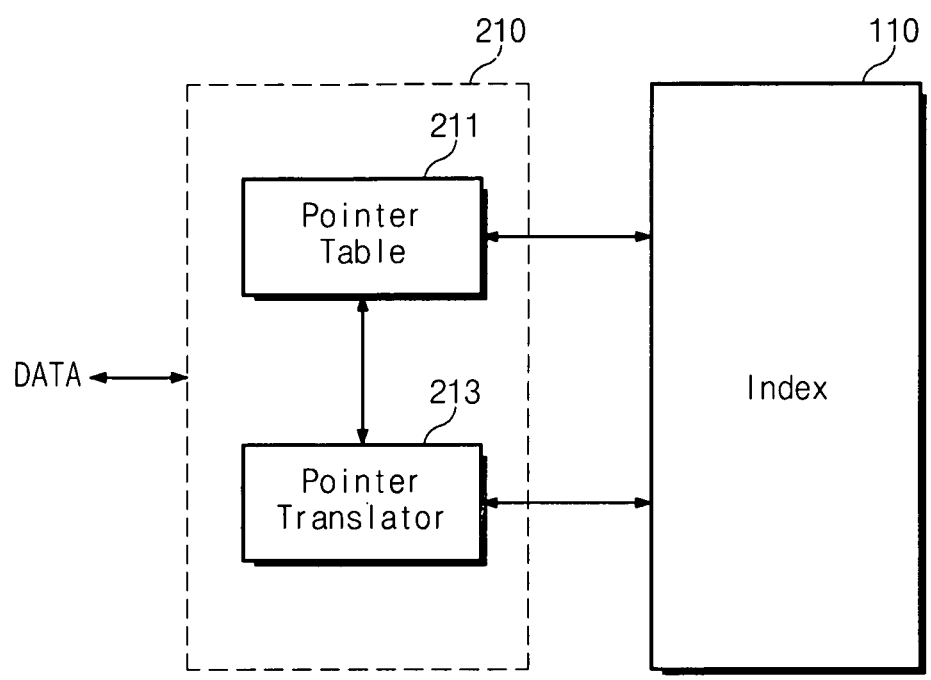
FIG. 6 is a block diagram of the index and an index control unit shown in FIG. 1.

FIG. 6 is a block diagram of the index 110 and an index control unit 210 shown in FIG. 1. It is assumed that the index 110 has an index tree configuration, as set forth in FIG. 2. Each index node may include keys and pointers corresponding to each of the keys. Each of the pointers may include a pointer ID.

Referring to FIG. 6, the index control unit 210 externally receives data for accessing the index 110. According to example embodiments, the data may be generated by the controller 200 shown in FIG. 1. According to other example embodiments, the data may be transmitted from a host 200 external to the controller 200 shown in FIG. 1.

The index control unit 210 includes a pointer table 211 and a pointer translator 213. The pointer table 211 indicates mapping relationship between pointer IDs and addresses of index nodes of the index 110.

The pointer translator 213 may access a pointer ID corresponding to a selected key of an index node of the index 110 in the flash memory 100. The pointer translator 213 translates the accessed pointer ID to an index address of the index node corresponding to the selected key. Based on the translated index address, the index control unit 210 may access the index 110.

FIG. 7 illustrates data of index nodes according to example embodiments. Referring to FIG. 7, each index node includes keys and pointers corresponding to each of the keys. The index nodes 111-117 and keys "A, B, a-d, and 1-8" of the index nodes 111-117 are the same as described with reference to FIGS. 2 and 3.

Pointers of index nodes set forth in FIGS. 2 and 3 indicate addresses of the index nodes, while pointers of the index nodes 111-117, according to example embodiments, are configured to indicate IDs of corresponding index nodes. As an example, a pointer of a key "B" of the index node 111 may be configured to indicate a pointer ID ID_113 instead of an address ADDR_113 of corresponding index node 113.

FIG. 8 illustrates an example of the pointer table 211 shown in FIG. 6. Referring to FIG. 8, the pointer table 211 has a pointer ID field and an index address field. The pointer ID field includes IDs ID_12~ID_117 of index nodes 112-117. The index address field includes addresses ADDR_112~ADDR_117 of the index nodes 112-117.

The pointer table 211 provides mapping between a pointer ID and an index address. According to example embodiments, when a pointer ID (e.g., ID_113) of an index node (e.g., 113) is transferred from a pointer translator (e.g., 213 in FIG. 6), a pointer table 211 may translate an index address (e.g., ADDR_113) of the index node (e.g., 113). That is, an ID accessed in the index 110 is translated to an address of a corresponding index node by the pointer table 211. Afterwards, based on the translated index address, the index control unit 210 may access the index 110.

Figure 9:
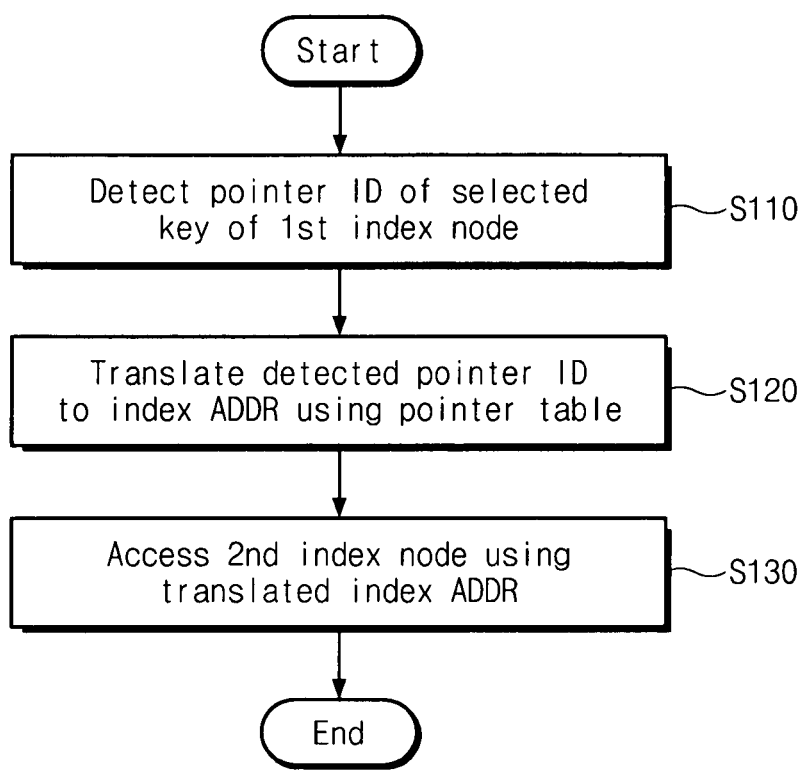
FIG. 9 is a flowchart illustrating a method of accessing an index by the index control unit shown in FIG. 6.

FIG. 9 is a flowchart illustrating a method of accessing an index 110 by the index control unit 210 shown in FIG. 6. Referring to FIGS. 2 and 9, at S110, the index control unit 210 detects a pointer ID of a selected key of a first index node. For example, it is assumed that the key "B" of the index node 111 is selected. At the index 110 stored in the flash memory 100, the index control unit 210 may detect a pointer ID ID_113 of the selected key "B" of the index node 111.

At S120, the index control unit 210 translates the detected pointer ID to an index address by using the pointer table 211. According to example embodiments, the pointer translator 213 of the pointer control unit 210 may translate the detected pointer ID ID_113 by using the pointer table 211. Referring to the pointer table 211 in FIG. 8, an index address corresponding to the pointer ID ID_113 is ADDR_113.

At S130, the index control unit 210 may access a second index node by using the translated index address. According to example embodiments, the index control unit 210 may access an index node 113 corresponding to the selected key "B" of the index node 111 by using the translated index address ADDR_113.

Similarly, if one (e.g., "c") of the keys "c" and "d" of the index node 113 is selected, an index node (e.g., 116) corresponding to the selected key (e.g., "c") may be accessed through S110 to S130. It will be understood that S110 to S130 may be commonly applied to the index 110 including index nodes 111-117.

As set forth above, an index node provides a pointer ID corresponding to a selected key. The pointer table 211 translates the provided pointer ID to an index address. Because the index node indicates an area in which an index node corresponding to a selected key is stored, it will be understood that the index node corresponding to a selected key may be accessed using the pointer table 211.

Figure 10:
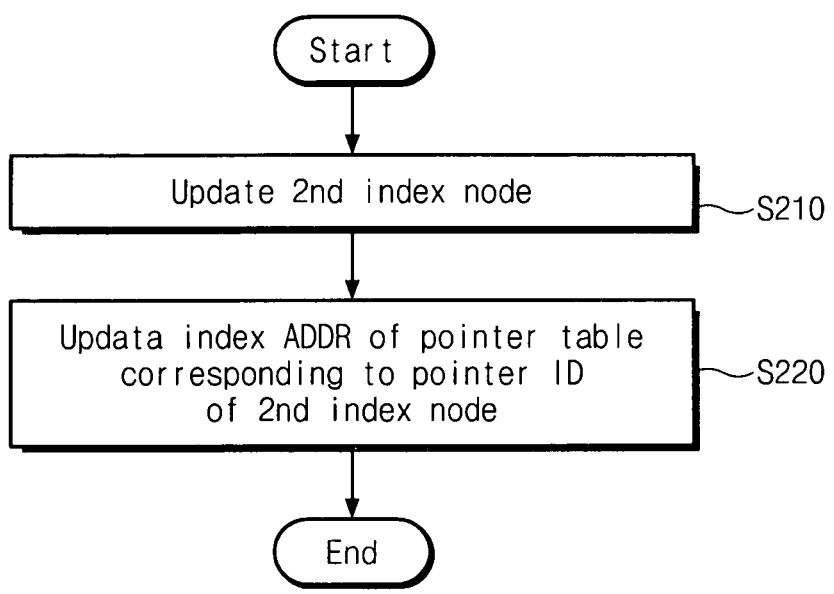
FIG. 10 is a flowchart illustrating a method of updating an index by the index control unit shown in FIG. 6.

FIG. 10 is a flowchart illustrating a method of updating an index 110 by the index control unit 210 shown in FIG. 6. Referring to FIG. 2 and FIGS. 6 to 10, at S210, a second index node is updated. For example, it is assumed that among index nodes 111-117, the index node 116 is updated. And it is assumed that the index node 116 stored at the index address ADDR_116 is updated to be stored at an index address ADDR_116'.

At S220, in the pointer table 211, the index control unit 210 updates an index address corresponding to a pointer ID of the second index node. According to example embodiments, in the pointer table 211, the index control unit 210 may update an index address corresponding to a pointer ID ID_116 of the index node 116 to a post-updated address ADDR_116' from a pre-updated address ADDR_116.

Afterwards, when the index node 116 is accessed by the index control unit 210, the pointer translator 213 may translate the pointer ID ID_116 corresponding to the index node 116 to an updated index address ADDR_116' by using the pointer table 211. Based on the translated index address ADDR_116', the index control unit 210 may access the index node 116.

That is, if an index node 116 is updated, the index address ADDR_116 corresponding to the pointer ID ID_116 of the updated index node 116 is also updated.

The index nodes, according to example embodiments, include keys and pointer IDs corresponding to each of the keys. Update of the index address ADDR_111~ADDR_117 does not affect data of the index nodes 111-117. That is, it will be understood that although one (116) of the index nodes 111-117 is updated to change an address, there is no need for updating the index nodes 111-115 and 117 except the updated index node 116.

According to example embodiments, the pointer table 211 may be stored in a flash memory (100 in FIG. 1). During power-on reset, the pointer table 211 may be loaded to an operation memory of the controller 200 from the flash memory 100. According to example embodiments, the operation memory of the controller 200 may be a random readable and writable memory. If the pointer table 211 is driven during the operation of the controller 200, an overhead caused by update of the pointer table 211 may be reduced.

Since the pointer table 211 indicates information only on correspondence between a pointer ID and index addresses, it will be understood that the pointer table 211 may be embodied to have a lower capacity than index nodes including key values. That is, it will be understood that loading the pointer table 211 to the operation memory of the controller 200 may be conducted with lower costs and complexity than loading index nodes to the operation memory of the controller 200.

According to example embodiments, the index control unit 210 may update the pointer table 211 during the operation memory of the controller 200. For example, during a power-off or log-off operation of the user device 10, the index control unit 210 may update the pointer table 211 stored in the operation memory of the controller 200. For example, at a desired time interval, the index control unit 210 may update the flash memory with the pointer table 211 stored in the operation memory of the controller 200 For example, if the pointer table 211 is updated at desired times, the index control unit 210 may update the flash memory with the pointer table 211 stored in the operation memory of the controller 200.

According to example embodiments, the controller 200 may further include a random-accessible resistance variable memory such as PRAM, MRAM, FRAM, and RRAM. The pointer table 211 may be stored, maintained, and driven in the resistance variable memory of the controller 200. If the pointer table 211 is stored and driven in the resistance variable memory of the controller 200, there is no requirement to update the flash memory 100 of the pointer table 211. Because the resistance variable memory is a random readable and writable memory, an overhead caused by update of the pointer table 211 may be reduced.

As set forth above, the index 110 according to example embodiments of the present invention includes keys and pointer IDs corresponding to each of the keys. The user device 10, according to example embodiments, includes a pointer table 211 configured to map a pointer ID and an index address. Therefore, it will be understood that an overhead caused by update of the pointer table 211 may be reduced.

As set forth in the above example embodiments, the pointer table 211 described with reference to FIG. 8 includes addresses pointer IDs ID_112~ID_117 and ADDR_112~ADDR_117 of index nodes 112-117. However, the contents of the pointer table 211 are not limited thereto.

According to example embodiments, the pointer table 211 may further include an address ADDR_111 of the uppermost index node 111. During power-on reset, the pointer table 211 may be loaded to the operation memory of the controller 211. The index control unit 210 may detect the address ADDR_111 of the uppermost index node 111 with reference to the pointer table 211 loaded to the operation memory of the controller 200.

The index control unit 210 may access the uppermost index node 111, based on the detected address ADDR_111. It will be understood that even when the pointer table 211 is stored, maintained, and driven in the resistance variable memory of the controller 200, the index control unit 210 may access the uppermost index node 111 by means of the above-described manner. If the uppermost index node 111 is accessed, the other index nodes 112-117 may be accessed and updated by means of the manner described with reference to FIGS. 9 and 10.

Figure 11:
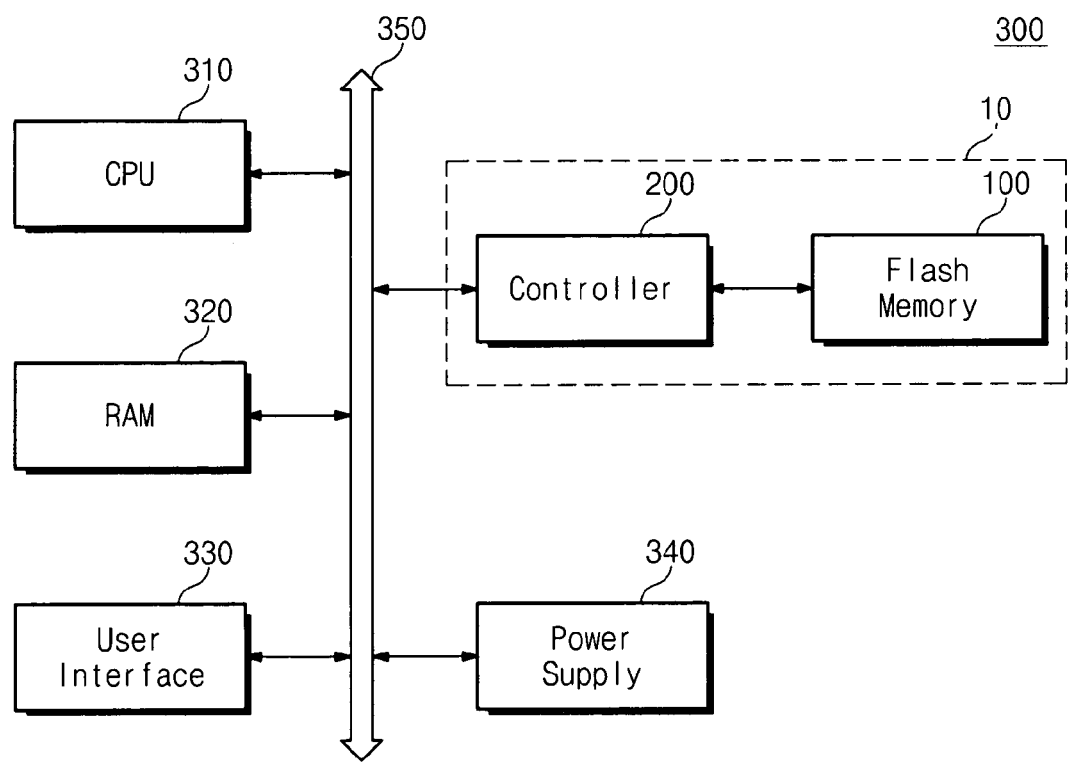
FIG. 11 is a block diagram of a user device according to another example embodiment.

FIG. 11 is a block diagram of a user device 300 according to another example embodiment. The user device 300 includes a central processing unit (CPU) 310, a random access memory (RAM) 320, a user interface 330, a power supply 340, and a memory system 10.

The memory system 10 may be organized with the same structure as the user device 10 described with reference to FIGS. 1 to 10. That is, the memory system 10 may include an index node including a pointer ID and a pointer table. A flash memory 100 of the memory system 10 may be configured to operate in a manner similar to the flash memory 100 described with reference to FIGS. 1 to 10. A controller 200 of the memory system 10 may be configured to operate in a manner similar to the controller 200 described with reference to FIGS. 1 to 10.

The memory system 10 is electrically connected to the CPU 310, the RAM 320, the user interface 330, and the power supply 340 through a system bus 350. Data provided through the user interface 330 or processed by the CPU 310 is stored in the memory system 10. The memory system 10 includes the controller, 200 and the flash memory 100.

When the memory system 10 is used as a solid-state disk/drive (SSD), booting speed of the user device 300 may be improved. Although not shown in this figure, it will be understood by those skilled in the art that a memory system according to example embodiments further include an application chipset, a camera image processor and the like.

Figure 12:
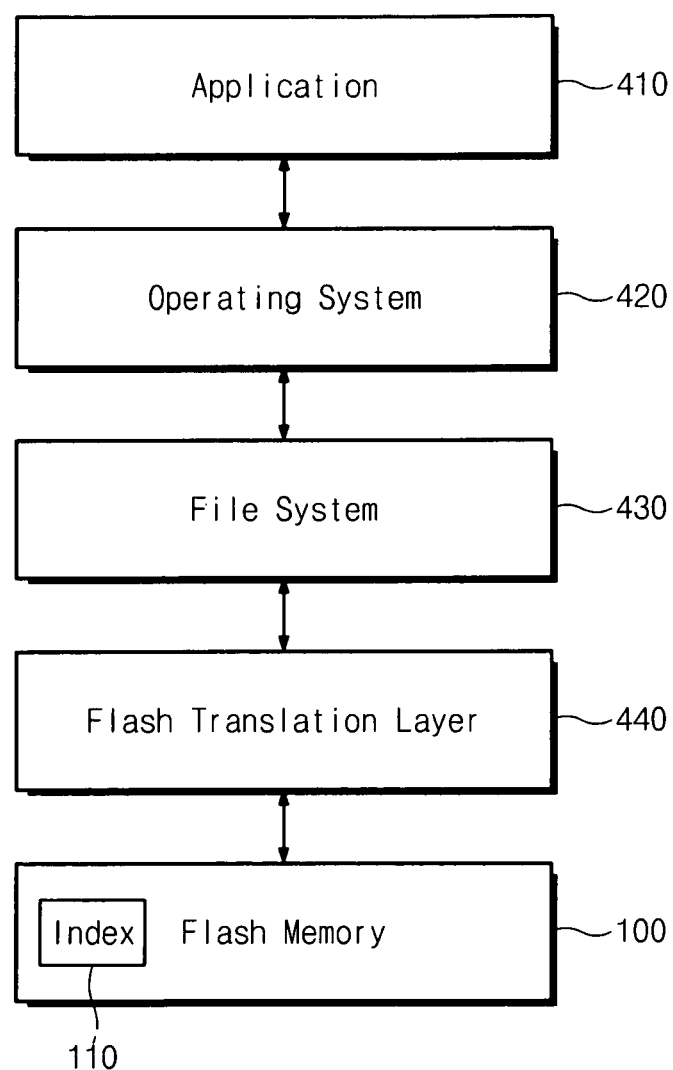
FIG. 12 is a block diagram of a software layer of the user device shown in FIG. 11.

FIG. 12 is a block diagram of a software layer 400 of the user device 300 shown in FIG. 11. The software layer 400 includes an application 410, an operating system 420, a file system 430, a flash translation layer 440, and a flash memory 110.

The application 410 may indicate various application programs run in the user device 300. As an example, the application 410 may include a text editor, a spreadsheet, database, an Internet explorer, a voice player or a video player. According to example embodiments, the application 410 may be run by a CPU 310 of the user device 300.

The operating system 420 may control the operations of the user device 300. The operating 420 may include, for example, Windows, Windows CE, Mac OS, Linux, Unix, OS/2, Solaris, Symbian OS, Palm OS, BSD, and DOS. According to example embodiments, the operating system 420 may be driven by the CPU 310 of the user device 300.

The file system 430 may manage a storage space of the flash memory 100 and data stored in the flash memory 100. The file system 430 may include, for example, FAT, FAT32, NTFS, HFS, JSF2, XFS, ODS-5, UDF, ZFS, UFS (Unix File System), ext2, ext3, ext4, ReiserFS, Reiser4, ISO 9660, Gnome VFS, BFS or WinFS. According to example embodiments, the file system 430 may be driven by the processor 310 of the user device 300.

The flash translation layer 440 includes mapping information for translating a logic address transferred to access the flash memory 100 from the application 410, the operating system 420, and the file system 430 to a physical address of the flash memory 100. The flash translation layer 440 is configured to translate a logic address to a physical address of the flash memory 100 by using the mapping information. According to example embodiments, the flash translation layer 440 may be configured to perform background operations such as garbage collection and merge. According to example embodiments, the flash translation layer 440 may be driven by the controller 200 of the memory system 10 of the user device 300.

The flash memory 100 is configured to store data therein. The flash memory 100 may be, for example, a NAND-type flash memory. The flash memory 100 may include a plurality of memory blocks BLK1-BLKm each including a plurality of pages. Each of the pages may include a plurality of memory cells for storing data. The flash memory 100 may perform a write operation by a unit of page and perform an erase operation by a unit of block. The flash memory 100 may have an erase-before-write characteristic. The flash memory 100 may be configured to store an index 110 described with reference to FIGS. 1 to 10.

In some exemplary embodiments, an index control unit 210 described with reference to FIG. 8 may be embodied in form of software corresponding to the flash translation layer 440. In other exemplary embodiments, it will be understood that an index control unit 210 may be embodied in form of software corresponding to one of the file system 430, the operating system 420, and/or the application 410.

As discussed above, a pointer ID of a selected key is translated to an index address by using a pointer table and an index node corresponding to the index address is accessed. Because only mapping between a pointer ID and an index address is altered regardless of variation of a lower index node, an index access speed is improved.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A user device comprising:
a flash memory configured to store an index including a plurality of index nodes; and
a controller including a pointer table, the pointer table containing a pointer ID and a corresponding index address for each of the plurality of index nodes, the controller configured to control the flash memory, wherein
the controller is configured to,
detect the pointer ID corresponding to a selected key of a first index node of the plurality of index nodes,
translate the detected pointer ID to the index address by using the pointer table, and
access a second index node of the plurality of index nodes stored in the flash memory by using the translated index address of the second index node stored in the pointer table on the controller, the second index node corresponding to the selected key.

2. The user device as set forth in claim 1, wherein the controller includes an index control unit configured to control an operation of accessing the index stored in the flash memory.

3. The user device as set forth in claim 2, wherein the index control unit comprises:
the pointer table configured to indicate a mapping relationship between the pointer ID and an index address; and
a pointer translator configured to translate the detected pointer ID to an index address by using the pointer table.

4. The user device as set forth in claim 1, wherein
when the second index node of the plurality of index nodes is updated, the controller is configured to replace, in the pointer table, an index address mapped to the pointer ID of the first index node to an address of an area of the flash memory in which the updated second index node is stored.

5. The user device as set forth in claim 1, wherein the pointer table is stored in the flash memory.

6. The user device as set forth in claim 5, further comprising:
an operation memory, wherein the controller is configured to look up the pointer table after loading the pointer table to the operation memory.

7. The user device as set forth in claim 6, wherein when the pointer table is updated, the controller is configured to update the flash memory with the updated pointer table.

8. The user device as set forth in claim 6, wherein the controller is configured to update the flash memory with the pointer table loaded in the operation memory at regular time intervals.

9. The user device as set forth in claim 1, further comprising:
a resistance variable memory, wherein the pointer table is stored and driven in the resistance variable memory.

10. The user device as set forth in claim 1, wherein the flash memory and the controller constitute a solid-state drive (SSD).

11. The user device as set forth in claim 1, wherein the flash memory and the controller constitute a memory card.

12. The user device as set forth in claim 1, wherein the controller is configured to, translate the detected pointer ID to the index address by accessing a same location of the pointer table each time the detected pointer ID is to be translated, and the pointer table is configured to store a single index address for each key.

13. The user device as set forth in claim 1, wherein the selected key is stored at the first index node.

14. A method of accessing, by a controller, an index stored in a flash memory, the index including a plurality of index nodes and the controller including a pointer table, the pointer table containing a pointer ID and a corresponding index address for each of the plurality of index nodes, the method comprising:
- detecting, by the controller, the pointer ID corresponding to a selected key of a first index node of the plurality of index nodes;
- translating, by the controller, the detected pointer ID to the index address by using the pointer table; and
- accessing, by the controller, a second index node of the plurality of index nodes stored in the flash memory by using the translated index address of the second index node stored in the pointer table on the controller, the second index node corresponding to the selected key.

15. The method as set forth in claim 14, wherein the translating the detected pointer ID to the index address is performed by accessing a same location of the pointer table each time the detected pointer ID is to be translated, and the pointer table is configured to store a single index address for each key.

16. The method as set forth in claim 14, wherein the selected key is stored at the first index node.

* * * * *